(12) United States Patent
Meier

(10) Patent No.: US 10,824,573 B1
(45) Date of Patent: Nov. 3, 2020

(54) REFRESH AND ACCESS MODES FOR MEMORY

(71) Applicant: Micron Technology, Inc., Boise, ID (US)

(72) Inventor: Nathaniel J. Meier, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 12 days.

(21) Appl. No.: 16/389,633

(22) Filed: Apr. 19, 2019

(51) Int. Cl.
*G06F 12/00* (2006.01)
*G06F 12/14* (2006.01)
*G06F 21/62* (2013.01)
*G06F 3/06* (2006.01)
*G11C 11/406* (2006.01)

(52) U.S. Cl.
CPC ........ *G06F 12/1466* (2013.01); *G06F 3/0659* (2013.01); *G06F 21/6218* (2013.01); *G11C 11/40611* (2013.01)

(58) Field of Classification Search
CPC ............ G06F 12/1466; G06F 12/1458; G11C 11/40607; G11C 11/40603; G11C 11/40606
See application file for complete search history.

(56) References Cited

U.S. PATENT DOCUMENTS

| | | | |
|---|---|---|---|
| 5,146,589 A | 9/1992 | Peet et al. | |
| 6,134,167 A | 10/2000 | Atkinson et al. | |
| 8,024,638 B2 | 9/2011 | Resnick et al. | |
| 9,390,782 B2 | 7/2016 | Best et al. | |
| 9,911,485 B2* | 3/2018 | Sriramagiri | G11C 11/40626 |
| 2009/0141576 A1* | 6/2009 | Ruckerbauer | G11C 7/04 365/222 |
| 2019/0006001 A1* | 1/2019 | Chun | G11C 11/40615 |
| 2019/0369893 A1* | 12/2019 | Ross | G06F 3/0604 |
| 2020/0027500 A1* | 1/2020 | Heymann | G06F 13/1668 |

* cited by examiner

*Primary Examiner* — Baboucarr Faal
(74) *Attorney, Agent, or Firm* — Brooks, Cameron & Huebsch, PLLC

(57) ABSTRACT

Apparatuses and methods related to implementing refresh and access modes for memory. The refresh and access modes can be used to configure a portion of memory. The portions of memory can correspond to protected regions of memory. The refresh and access modes can influence the security level of data stored in the protected regions of memory.

25 Claims, 6 Drawing Sheets

REFRESH AND ACCESS MODES FOR MEMORY

TECHNICAL FIELD

The present disclosure relates generally to memory devices, and more particularly to apparatuses and methods associated with implementing refresh modes and access modes for memory.

BACKGROUND

Memory devices are typically provided as internal, semiconductor, integrated circuits in computers or other electronic devices. There are many different types of memory including volatile and non-volatile memory. Volatile memory can require power to maintain its data and includes random-access memory (RAM), dynamic random access memory (DRAM), and synchronous dynamic random access memory (SDRAM), among others. Non-volatile memory can provide persistent data by retaining stored data when not powered and can include NAND flash memory, NOR flash memory, read only memory (ROM), Electrically Erasable Programmable ROM (EEPROM), Erasable Programmable ROM (EPROM), and resistance variable memory such as phase change random access memory (PCRAM), resistive random access memory (RRAM), and magnetoresistive random access memory (MRAM), among others.

Memory is also utilized as volatile and non-volatile data storage for a wide range of electronic applications. including, but not limited to personal computers, portable memory sticks, digital cameras, cellular telephones, portable music players such as MP3 players, movie players, and other electronic devices. Memory cells can be arranged into arrays, with the arrays being used in memory devices.

Various computing systems include a number of processing resources that are coupled to memory (e.g., a memory system), which is accessed in association with executing a set of instructions (e.g., a program, applications, etc.). Data stored in memory can be of various types and can often include sensitive data such as passwords and personal information. Data stored in memory can become less reliable over time due to degradation mechanisms such as charge leakage and/or disturb mechanisms associated with accessing the cells (e.g., reading, writing, erasing, etc.). Additionally, data stored in memory may be intentionally altered by unauthorized entities (e.g., hackers) through a row hammer attack, for example. Such unauthorized entities may also attempt to obtain or corrupt data, which can include sensitive data, stored in memory.

DETAILED DESCRIPTION

Figure 1:
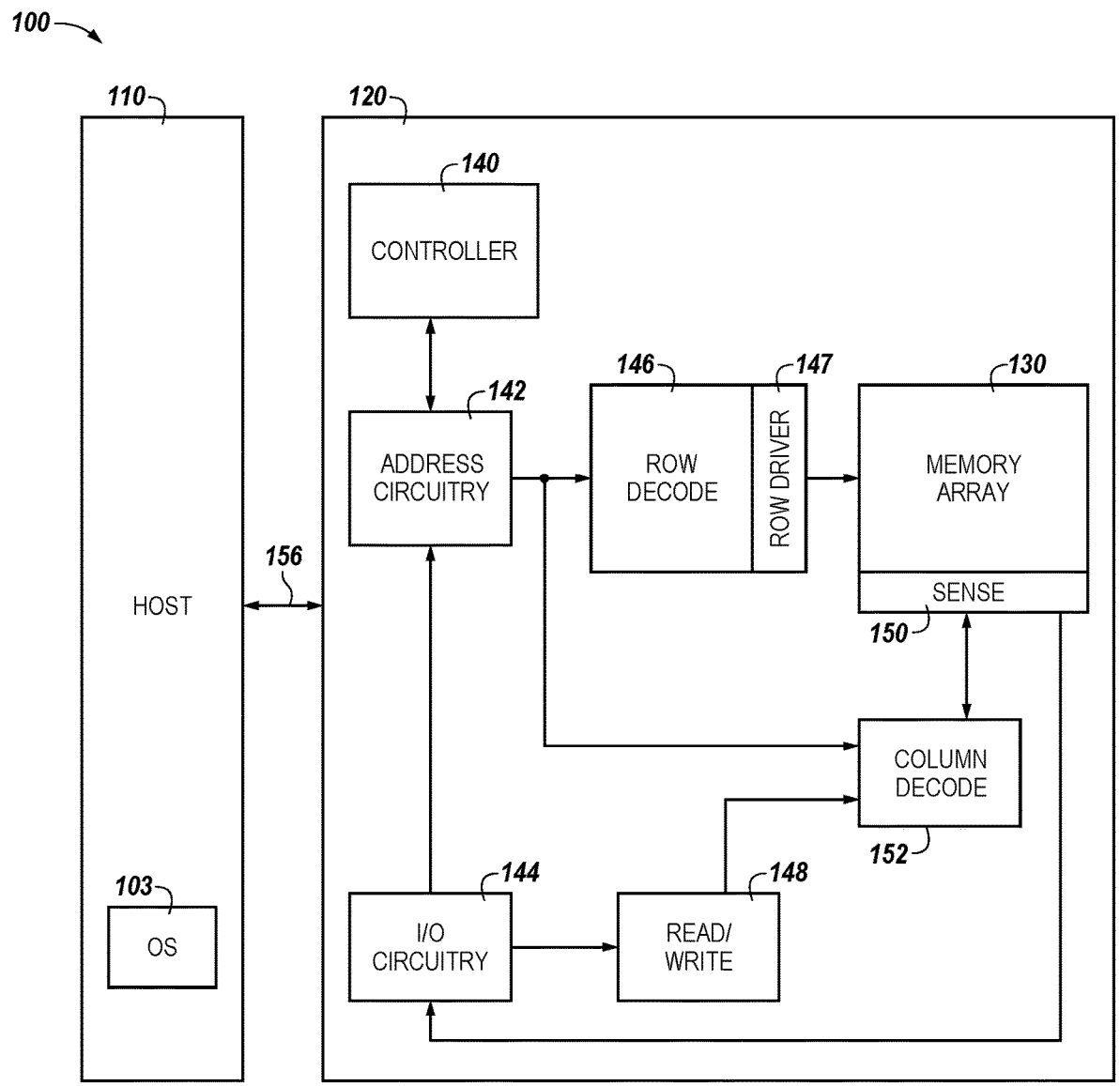
FIG. 1 is a block diagram of an apparatus in the form of a computing system including a memory device in accordance with a number of embodiments of the present disclosure.

The present disclosure includes apparatuses and methods related to implementing refresh modes and access modes for memory. Securing data can include preventing unauthorized access to memory cells in which the data is stored and/or improving the retention (e.g., reliability) of the data stored in the memory cells. Data stored in memory can become unreliable (e.g., lost) due to various factors.

For example, charge leakage from memory cells can result in a loss of the data stored in the memory cells. Various memory cells (e.g., volatile memory cells) can be periodically refreshed at a particular rate to retain stored data values. For example, a DRAM cell may be refreshed by charging a capacitor serving as the charge storage structure for the cell to a particular voltage. Although, the refresh process may be sufficient (e.g., frequent enough) to maintain data integrity in many instances, the voltages on cell capacitors can change due to various factors. For instance, memory cells corresponding to a particular row can be affected by row hammer. Row hammer refers to undesirable changes in capacitor voltages of DRAM cells corresponding to a row neighboring a row being frequently accessed. As an example, a hacker may employ a row hammer attack to intentionally alter data stored in memory by repeatedly accessing a particular row in rapid succession. Refreshing the cells at a faster rate (e.g., more frequently) can improve the reliability of the data stored in the memory cells by reducing row hammer effects, for example. However, an increased refresh rate involves increased power consumption.

As an example, sensing (e.g., reading) a data value (e.g., bit) stored in a memory cell can often involve sensing a relatively small voltage difference on a pair of sense lines, which may be referred to as digit lines or data lines. Therefore, it can be beneficial to provide increased voltage differentials to be sensed. For instance, more than one storage structure (e.g., capacitor) may be used to store a particular bit value. As one example, in a one transistor one capacitor (1T1C) DRAM cell, charge corresponding to a bit value is stored on (and sensed from) a single capacitor. In contrast, in a 2T2C DRAM cell, charge is stored on (and sensed) from two capacitors via differential digit lines coupled to a sense amplifier. Therefore, a 2T2C memory cells can have an increased sense margin and can be less susceptible to adverse effects due to charge leakage, for example, as compared to 1T1C memory cells. However, memory arrays employing 2T2C cells have a reduced storage density as compared to memory arrays employing 1T1C cells. As described further herein, in some instances, an array of memory cells can be accessed in either a 1T1C mode or a 2T2C mode and/or different regions of an array may be accessed in different modes.

As described further herein, various embodiments of the present disclosure can implement different refresh modes and/or different access modes for different regions of a memory array. For example, an array may be operated in a secure mode in which particular security features are applied. In a secure mode, particular regions (e.g., address spaces) of the array may be designated as secure regions which are not accessible in the absence of an authentication process. Such secure regions may be referred to herein as "protected regions." In various embodiments, the refresh modes and/or access modes associated with the secure regions can be selected to further increase the security and/or reliability of the secure regions. As an example, an increased refresh rate and/or a 2T2C access mode may be assigned to the secure regions. As used herein, a region can describe any portion of the memory device, a set of memory devices on a module, or a set of modules in a memory system that share a same register setting. A region can also describe bank groups, banks, bank addresses, range of addresses, and/or row range, among others.

As used herein, a refresh mode and/or an access mode can be referred to as operation modes. For example, modifying an operation mode of a memory device can include changing a refresh mode and/or an access mode of the memory device.

Secure regions can be established to mitigate unauthorized memory accesses by verifying access commands as authorized utilizing credentials provided along with, or as part of, access commands. The credentials can be stored in a plurality of registers implemented in the memory device prior to receipt of the access command (e.g., from a host). As used herein, an access command can include one or more commands. An access command can be one of a pre-charge command, an activate command, a read command, and/or a write command, among other possible commands. The access command can include one or more commands including one or more of the pre-charge commands, the activate commands, the read command, and/or the write commands. In various embodiments, an access command can be propagated into a plurality of access commands. For example, an access command can be a read command which can be propagated into the access commands including a pre-charge command, an activate command, and a read command.

The authorization of an access command can be verified utilizing a key (e.g., credential(s)). The access command can request access to an address and/or a plurality of addresses. The memory device can determine whether the address is locked or unlocked based on a security mode associated with the address. If the address is locked, then the memory device can refrain from providing access to the address unless a key associated with the access command is also provided to the memory device. The key can be verified against a stored key to determine whether to unlock the address.

If the key matches the stored key, then the memory device can unlock the address and can provide access to the address(es). If the key does not match the stored key, then the memory device can prevent access to the address(es).

In various examples, an initial authorized access command can result in an unlocking of a protected region of memory to allow access thereto (e.g., to a physical row). However, the protected region may not be re-locked until after a number of access commands have been executed, leaving the protected region in what may be referred to as a persistent unlocked state. While the protected region is unlocked, access commands may be capable of accessing the protected region (e.g., without having to be verified using a key).

In various embodiments, the access modes and/or the refresh modes that are applied to particular regions of the memory array can depend on whether the regions are designated as secure regions or not. However, different regions of the array can have different access modes and/or refresh modes applied thereto independent of whether the regions are secure regions (e.g., protected regions) of the memory array. For example, a portion of the array implementing a specific access mode or refresh mode may not be a protected region of the array. However, various examples provided herein are in the context of protected regions of the memory array. The portions of the array to which the access modes and refresh modes are applied can be defined without utilizing a key. For example, the portions of the array to which the access modes and refresh modes are applied can be defined utilizing an address range stored in registers of the memory device.

As used herein, "a number of" something can refer to one or more of such things. For example, a number of memory devices can refer to one or more memory devices. A "plurality" of something intends two or more. Additionally, designators such as "N," as used herein, particularly with respect to reference numerals in the drawings, indicates that a number of the particular feature so designated can be included with a number of embodiments of the present disclosure.

The figures herein follow a numbering convention in which the first digit or digits correspond to the drawing figure number and the remaining digits identify an element or component in the drawing. Similar elements or components between different figures may be identified by the use of similar digits. As will be appreciated, elements shown in the various embodiments herein can be added, exchanged, and/or eliminated so as to provide a number of additional embodiments of the present disclosure. In addition, the proportion and the relative scale of the elements provided in the figures are intended to illustrate various embodiments of the present disclosure and are not to be used in a limiting sense.

FIG. 1 is a block diagram of an apparatus in the form of a computing system 100 including a memory device 120 in accordance with a number of embodiments of the present disclosure. As used herein, a memory device 120, a memory array 130, and/or host 110, for example, might also be separately considered an "apparatus."

In this example, system 100 includes a host 110 coupled to memory device 120 via an interface 156. The computing system 100 can be a personal laptop computer, a desktop computer, a digital camera, a mobile telephone, a memory card reader, or an Internet-of-Things (IoT) enabled device, among various other types of systems. Host 110 can include a number of processing resources (e.g., one or more processors, microprocessors, or some other type of controlling circuitry) capable of accessing memory 120. The system 100 can include separate integrated circuits, or both the host 110 and the memory device 120 can be on the same integrated circuit. For example, the host 110 may be a system controller of a memory system comprising multiple memory devices 120, with the system controller 110 providing access to the respective memory devices 120 by another processing resource such as a central processing unit (CPU).

In the example shown in FIG. 1, the host 110 is responsible for executing an operating system (OS) 103 and/or various applications that can be loaded thereto (e.g., from memory device 120 via controller 140). The host 110 may not be responsible for managing keys or addresses that define the protected region or regions. The host 110 can provide access commands and/or security mode initialization commands to a memory device via the interface 156. The memory device can utilize the access modes to define and determine the type of access to provide to the authorized access commands and to configure the desired region behaviors. The memory device can utilize a refresh mode to define the refresh rate of the protected region of the memory. In various examples, the memory device may provide an indication of an unauthorized access attempt. In various embodiments, the unauthorized access attempt can result in providing data to the host such that the issuer of the unauthorized access attempt remains unaware of the memory device's identification of the unauthorized access attempt. The data received from the memory device 120 may not be the data stored by the memory cells having the address provided by the access command. The host 110 may receive data generated responsive to identifying the access command as unauthorized.

For clarity, the system 100 has been simplified to focus on features with particular relevance to the present disclosure. The memory array 130 can be a DRAM array, SRAM array, STT RAM array, PCRAM array, TRAM array, RRAM array, NAND flash array, and/or NOR flash array, for instance. The array 130 can comprise memory cells arranged in rows coupled by access lines (which may be referred to herein as word lines or select lines) and columns coupled by sense lines (which may be referred to herein as digit lines or data lines). Although a single array 130 is shown in FIG. 1, embodiments are not so limited. For instance, memory device 120 may include a number of arrays 130 (e.g., a number of banks of DRAM cells).

The memory device 120 includes address circuitry 142 to latch address signals provided over an interface 156. The interface can include, for example, a physical interface employing a suitable protocol (e.g., a data bus, an address bus, and a command bus, or a combined data/address/command bus). Such protocol may be custom or proprietary, or the interface 156 may employ a standardized protocol, such as Peripheral Component Interconnect Express (PCIe), Gen-Z, CCIX, or the like. Address signals are received and decoded by a row decoder 146 and a column decoder 152 to access the memory array 130. Data can be read from memory array 130 by sensing voltage and/or current changes on the sense lines using sensing circuitry 150. The sensing circuitry 150 can comprise, for example, sense amplifiers that can read and latch a page (e.g., row) of data from the memory array 130. The I/O circuitry 144 can be used for bi-directional data communication with host 110 over the interface 156. The read/write circuitry 148 is used to write data to the memory array 130 or read data from the memory array 130. As an example, the circuitry 148 can comprise various drivers, latch circuitry, etc.

Controller 140 decodes signals provided by the host 110. These signals can include chip enable signals, write enable signals, and address latch signals that are used to control operations performed on the memory array 130, including data read, data write, and data erase operations. In various embodiments, the controller 140 is responsible for executing instructions from the host 110. The controller 140 can comprise a state machine, a sequencer, and/or some other type of control circuitry, which may be implemented in the form of hardware, firmware, or software, or any combination of the three.

In accordance with various embodiments, the controller 140 can be configured to decode a security mode initialization command received thereto. The security mode initialization command can be received from the host 110. The security mode initialization command can be provided to the memory device 120 to set a security mode of the memory device 120 and/or to designate one or more protected regions of the memory device 120. A security mode can include a locked mode and an unlocked mode. The memory device 120 can be configured to provide access to a protected region of the memory array 130 if the memory device 120 is in an unlocked mode or to prevent access to the protected region of the memory array 130 if the memory device 120 is in a locked mode.

The OS 103, as executed by the host 110, can initialize the security mode initialization command to store a key and an address or a range of addresses of the memory array 130 in one or more registers of the controller 140. The stored key and address can define the protected region of the memory array 130. The OS 103 can initialize the security mode initialization command during an initialization of the OS 103 or a time after the OS 103 is initialized.

The address received from the host 110 can be a logical address. A logical address can be translated, mapped, or resolved to a physical address. A logical address can include a virtual address, for example. The physical address may be used by the memory device 130 to access data from a memory array 130. The physical address can be directly mapped to a memory cells or row of the memory array 130. The logical address corresponding to the initialization command and/or access commands and received from the host 110 can be translated by the memory device 120 to generate the physical address. The physical address can be a physical row address of the memory array 130.

The key can be a security token used to gain access to a protected region of the memory array 130. The key can be encrypted or unencrypted. The key can be provided by the OS 103 and used by the OS 103 to access the protected region of the memory array 130. The key can be unique to a protected region of memory and/or can be associated with a plurality of protected regions of memory. As described further below, the key can comprise one or more bits which can be stored in one or more registers of the memory device 120.

The protected region of the memory array 130 describes a region of the memory array 130 that is protected using the key. The protected range can be defined by a first memory address and a second memory address. The first memory address can be a starting address and the second memory address can be an ending address. In various examples, the protected range is stored as a starting address and as an offset. The offset together with the starting address can be used to generate the ending address. The protected region can be continuous from the starting address to the ending address.

In various examples, the memory array 130 can comprise one or more protected regions. Each of the protected regions can be defined using a starting address and an offset. Each of the starting addresses corresponding to a different protected region can be unique and/or can be a same starting address. Each of the offsets can also be a same offset or a different offset.

In various examples, the security mode initialization command can be used to select a refresh mode and/or an access mode. In different examples, separate commands can be used to select a refresh mode and/or an access mode. For example, a refresh mode can be selected utilizing a refresh mode selection command while an access mode can be selected utilizing an access mode selection command.

The OS 102, as executed by the host 110, can initialize a refresh mode selection command to store a refresh rate in one or more registers of the controller 140. The OS 102 can also initialize an access mode selection command to store an access mode in one or more registers of the controller 140. The stored refresh rate and access mode can define a refresh rate and access mode for a protected region of the memory array initialized utilizing the security mode initialization command.

In various instances, the host 110 can provide an access command and/or a plurality of access commands to the memory device 120. Access commands can be provided to access a protected region of the memory device 120. The access command can be associated with an address or a range of addresses and a key. The memory device 120 can compare the provided address to a protected range to determine whether the address is within the protected range. If the address is within the protected range, the memory device 120 can compare the key with a stored key to determine whether the key and the stored key match. If the key matches the stored key, then the memory device can enter a non-persistent unlocked mode from a locked mode. The memory device 120 can, via the controller 140, enable a row driver to activate a row or rows of the memory array 130 corresponding to the address (e.g., protected region).

In various embodiments, the memory device 120 can determine a particular an access mode(s) implemented in the memory device 120. Modifying and/or retrieving a value representing an access mode can include comparing a key provided to a key stored in the memory device 120. The access mode corresponding to the protected region can be stored in one or more mode registers. The memory device 120 can enable the row driver to activate one or a plurality of rows of the memory array 130 based on the access mode retrieved from the mode registers.

Responsive to enabling the row driver, the memory device 120 can transition the protected region from a non-persistent unlocked mode to a locked mode. If the key does not match, the memory device 120 can, via the controller 140, prevent access to the protected region by preventing enablement of the row driver 147 of the memory array 130, thus preventing activation of a row corresponding to the access command.

Figure 2:
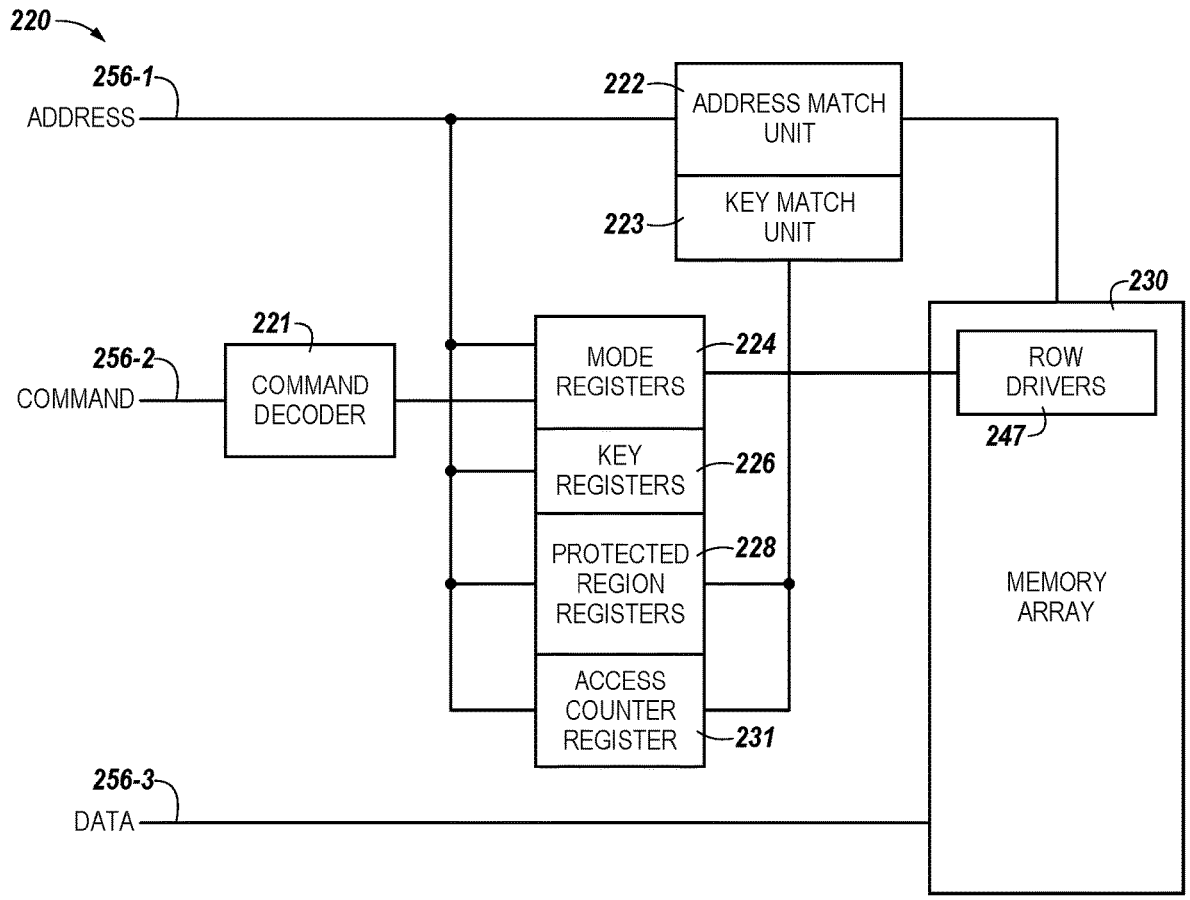
FIG. 2 is a block diagram of an apparatus in the form of a memory device including a memory array and portions of a controller capable of protecting regions of memory using a key in accordance with a number of embodiments of the present disclosure.

FIG. 2 is a block diagram of an apparatus in the form of a memory device 220 including a memory array 230 and portions of a controller capable of protecting regions of memory using a key in accordance with a number of embodiments of the present disclosure. The memory device 220 can be analogous to the memory device 120 in FIG. 1. The memory device 220 includes the memory array 230 and portions of a controller such as the controller 140 in FIG. 1.

The controller can include a command decoder 221, mode registers 224, a key register 226, protected region registers 228, and an access counter register 231. The controller can also include the address match unit 222 and a key match unit 223.

In this example, the interface (e.g., 156 shown in FIG. 1) comprises an address bus 256-1, a command bus 256-2, and a data bus 256-3. The device 220 can receive the security mode initialization command, the access commands, the access mode selection commands, and/or the refresh rate selection commands along with keys via the command bus 256-2. The device 220 can receive addresses via the address bus 256-1, and data can be provided to/from the device 220 via the data bus 256-3.

A host can provide, via the command bus 256-2, the security mode initialization command, the access commands, the access mode selection commands, and/or the refresh rate selection commands. For example, a host can provide, via the command bus 256-2, the security mode initialization command to initialize a security mode of the memory device 220. The memory device 220 can receive the security mode initialization command at the command decoder 221. The command decoder 220 can decode the security mode initialization command.

In various examples, the security mode initialization command can be associated with a key and a number of addresses received via the command bus 256-2 and the address bus 256-1. The controller can store a key in the key register 226 and can store the one or more addresses in the protected region registers 228. Each of the mode registers 224, the key registers 226, the protected region registers 228, and/or the access counter register 231 can be comprised of one or more registers. The buses 256-1, 256-2, and/or 256-3 can be implemented as one or more multi-purpose buses (e.g., via shared purpose pins). For example, the buses 256-1, 256-2, 256-3 can be a shared control/address/data bus implemented via a number of shared purpose pins.

The one or more addresses can be stored in the protected region registers 228 as a starting address and an offset. The starting address can be stored in a first register of the protected regions registers 228 and the offset can be stored in a second register of the protected region registers 228. The starting address and the ending address can define a protected region of the memory array 230 which can be stored in the protected region register 228. In various examples, the one or more addresses can be stored in the protected region registers 228 as a mask or an inverse mask. The mask or inverse mask can be a bit masks that can define a location of the protected region within the memory array.

The key can be stored in the key register 226. In various examples, a plurality of keys can be stored in one or more key registers including the key register 226. Each of the plurality of keys can be associated with a different one of the plurality of protected regions stored in the protected region registers including the protected region register 228. The plurality of keys can be used to allow access to the protected regions. For example, a first key can be used to allow access to a first protected region and a second key can be used to allow access to a second protected region.

Responsive to storing the key in the key register 226 and the address in the protected region register 228, the controller can change a security mode of the memory device 220 from an unlocked mode (e.g., persistent unlocked mode) to a locked mode in the mode registers 224. The mode registers 224 can include a security mode register. The security mode register can store a first value representing a persistent unlocked mode, a second value representing a non-persistent unlocked mode, and/or a third value representing a locked mode, among other possible modes. The locked mode can be used to prevent access to a protected region of the memory array 230. A persistent unlocked mode can be used to allow a plurality of instances of access to a protected region of the memory array 230 where a first access is provided contingent on a first key and the remaining instances of access are provided without verifying additional keys. A non-persistent unlocked mode can be used to allow a plurality of instances of access to the protected region of the memory array 230 where each instance of access is provided contingent on the verification of a different instance of a same key. In a non-persistent unlocked mode, each instance of access is followed by placing the protected region in a locked mode.

In various examples, responsive to receipt of the security mode initialization command, the controller can set or reset an access counter register 231. For example, the access counter register 231 can be set to zero. The access counter register 231 can provide a count of unauthorized access commands directed to the protected region of the memory array 230 (e.g., as defined by protected region register 228).

Responsive to receiving the security mode initialization command, the access mode selection command, and/or the refresh mode selection command, the controller can store an access mode and/or a refresh rate in one or more of the mode registers 224. For example, the controller can store an access mode corresponding to an access mode selection command. A first access mode can define the storage of a bit utilizing a memory cell while a second access mode can define the storage of a bit utilizing a number of memory cells. As such, the mode reregister from the mode registers 224 storing the access mode corresponding to the access mode selection command can store one of two different access modes. In different examples, more than two access modes can be stored in the mode registers 224. For example, one of three or more access modes can be represented in the modes registers and can correspond to a protected region having a key.

The controller can store a representation of a refresh rate in one or more of the mode registers 224. For example, the controller can store a representation of a first refresh mode or a second refresh mode in the mode registers 224. The first refresh mode can indicate a default refresh rate while the second refresh mode can indicate a refresh rate other than the default refresh rage. In other examples, the mode registers 224 can store one of a plurality of values corresponding to a plurality of different refresh modes.

In various examples, the access mode selection command and/or the refresh mode selection command can also be associated with the key corresponding to the protected region. That is, a key can be provided concurrently with the access mode selection command and/or the refresh mode selection command. The provided key can be compared to the key corresponding to the protected region. If the provided key matches the key corresponding to the protected region, then the controller can modify an access mode and/or a refresh mode corresponding to the protected region. If provided key does not match the key corresponding to the protected region, then the controller can refrain from modifying an access mode and/or a refresh mode corresponding to the protected region.

The controller can also process access commands. For example, an access command received via the command bus 256-2 can be decoded by the command decoder 221. The address match unit 222 can receive an address corresponding to the access command at the address match unit 222 of the controller. The address match unit 222 can determine whether the received address is within a protected region (e.g., as stored in the protected region register 228).

If the received address is in a protected region, then the controller, via the key match unit 223, can determine whether the key associated with the access command matches a key stored in the key register 226. If the key associated with the access command matches the key stored in the key register 226, then the controller can modify the mode registers 224 from a locked mode to a non-persistent unlocked mode.

The controller can provide a signal to the row drivers 247 to activate one or more rows corresponding to the received address if the mode registers 224 reflect an unlocked mode (e.g., non-persistent unlocked mode or persistent unlocked mode). The controller can prevent a signal from being provided to the row drivers 247 if the mode registers 224 reflect a locked mode. Although the row drivers 247 are shown as being in the memory array 230, the row drivers 247 can also be implemented externally to the memory array 230 as shown in FIG. 1.

Based on the specific access mode corresponding to the protected region, the controller may provide a signal to the row derivers 247 to activate one or more rows. For example, if a first access mode has been set for the protected region, then the controller can provide a signal to the row driver 247 to activate a single row corresponding to the received address if the mode registers 224 reflect an unlocked mode. If a second access mode has been set for the protected region, then the controller can provide a different signal to the row driver 247 to activate a plurality of rows corresponding to the received address if the mode registers 224 reflect an unlocked mode.

Responsive to providing a signal to the row drivers 247 while the protected region is in an un-persistent unlocked mode, the controller can place the protected region in a locked mode. In various embodiments, responsive to providing a signal to the row drivers 247 while the protected region is in a persistent unlocked mode, the controller may refrain from placing the protected region in the locked mode. In various examples, the controller may refrain from placing the protected region in the locked mode until a plurality of associated access sum-commands have been processed. For example, the controller may refrain from placing the protected region in the locked mode until a pre-charge command, an activate command, and a read command or a write command (e.g., access commands) have been processed by the controller.

An access command can be unauthorized if the key corresponding to the access command does not match a key stored in the key register 226. A key associated with the access command can be determined to not match a key stored in the key register 226 if no key is associated with the access command or if the key associated with the access command 226 does not have the same value as the key stored in key register 226. In some examples, a mismatch of the keys can be determined if the key stored in the key register 226 cannot be derived from the key associated with the access command. A key stored in the key register 226 can be derived from the key associated with the access command through an encryption process and/or a decryption process. In some instances, a key can be encrypted before being stored in the key register 226. The key associated with the access command may be unencrypted. Comparing an encrypted key with an unencrypted key can include decrypted an encrypted key and comparing the decrypted key with the unencrypted key. The encrypted key can be derived from the unencrypted key if the decrypted key matches the unencrypted key.

Figure 3A:
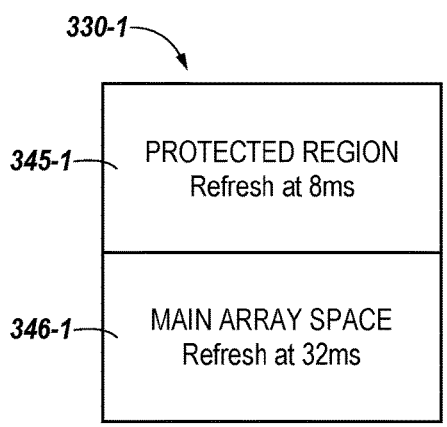
FIGS. 3A and 3B are block diagrams of memory arrays including protected regions having variable refresh rates in accordance with a number of embodiments of the present disclosure.
Figure 3B:
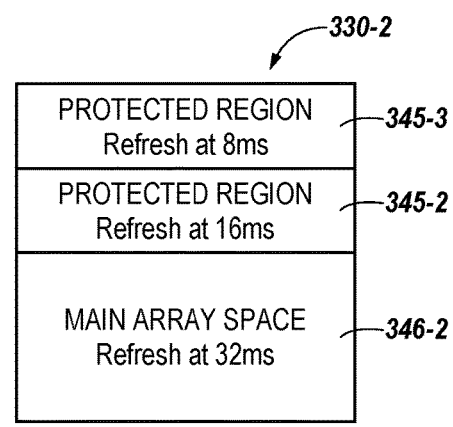

FIGS. 3A and 3B are block diagrams of memory arrays including protected regions having variable refresh rates in accordance with a number of embodiments of the present disclosure. FIGS. 3A and 3B show memory arrays 330-1 and 330-2, respectively. The memory array 330-1 includes a protected region 345-1 and main array space 346-1. The memory array 330-2 includes the protected regions 345-2 and 345-3 and main array space 346-2.

The memory array 330-1 shows the implementation of two different refresh rates. A first refresh rate is implemented for the main array space 346-1 of the memory array. The first refresh rate can be a default refresh rate. FIGS. 3A and 3B show the default refresh rate as a refresh rate of 32 ms (millisecond). The protected region 345-1 is shown has having a refresh rate of 8 ms.

The memory array 330-2 shows the implementation of three different refresh rates. A first refresh rate is implemented for the main array space 346-2 of the memory array 330-2. The first refresh rate is a default refresh rate of 32 ms. The second refresh rate for the memory array 330-2 is implemented for the protected region 345-2 as a refresh rate of 16 ms. The third refresh rate for the memory array 330-2 is shown as 8 ms. Memory array 330-2 shows the implementation of multiple protected regions each having a different refresh rate. In various examples, multiple protected regions can have different refresh rates or a same refresh rate.

In some examples, the refresh rate can be incremented or decremented from a default refresh rate. The default refresh rate can also be referred to as a native rate. Increasing the refresh rate can include shortening the interval between refreshes operations or increasing the number of rows refreshed in each refresh operation. Slowing the refresh rate can include lengthening the interval between refresh operations or decreasing the number of rows refreshed in each refresh operation. The refresh rate can be a factor of the default refresh rate. For example, if the default refresh rate is 32 ms, then the native rate can be 1× (e.g., such that 1×=32 ms). The refresh rate can be scaled up to, for example, 8×. A 2× refresh rate can be equal to 16 ms. A 3× refresh rate can be equal to 10.6 ms. A 4× refresh rate can be equal to 8 ms. And an 8× refresh rate can be equal to 4 ms. The native rate and the other refresh rates provided herein are provided as examples and other native rates and/or refresh rates can be selected.

The mode registers storing the refresh rate can be programmed using three bits, for example. The 000 bit-value can represent a 1× native rate which can be equal to 32 ms. The 001 bit-value can represent a 2× refresh rate which can be equal to 16 ms refresh rate. The 010 bit-value can represent a 3× refresh rate which can be equal to 10.6 ms refresh rate. The 011 bit-value can represent a 4× refresh rate which can be equal to 8 ms refresh rate. The 100 bit-value can represent a 5× refresh rate which can be equal to 6.4 ms refresh rate. The 101 bit-value can represent a 6× refresh rate which can be equal to 5.3 ms refresh rate, among other possible refresh rates.

Modifying the refresh rate corresponding to a region of the memory or the entire memory provides the ability to customize the balance between power and security. Incrementing the refresh rate increases the power utilized and improves security of the stored data. By shortening the interval between refreshes, there is less time for a charge stored in a memory cell to be leaked or lost. However, shortening the interval between refreshes also utilizes more power. By lengthening the interval between refreshes, there is more time for a charge stored in a memory cell to be leaked or lost. However, lengthening the interval between refreshes also utilizes less power.

In view of the security aspects of modifying the refresh rates, a refresh rate corresponding to a region of memory can be assigned based on the security specifications utilized for the region of memory. For example, the protected region 345-1 may have a higher priority than the main array space 346-1 resulting in a shorter refresh rate of 8 ms being assigned to the protected region 345-1. The protected region 345-2 may have a higher priority than the protected region 345-3 which may have a higher priority than the main array space 346-2 resulting in the assignment of a shorter refresh rate of 8 ms to the protected region 345-2, an assignment of the refresh rate of 16 ms to the protected region 345-3, and an assignment of the refresh rate of 32 ms to the main array space 346-2.

The assigning of refresh rates to the multiple protected regions 345-1, 345-2, and 345-3 can correspond with a hierarchy of the multiple protected regions 345-1, 345-2, and 345-3. For example, the higher priority of a protected region, the shorter the refresh rate that is assigned to the given protected region.

In various examples, an apparatus can comprise the memory array (e.g., memory arrays 330-1, and 330-2), mode registers configured to identify a refresh rate of the memory array, and control circuitry. The control circuitry can be configured to receive a request to modify the refresh rate of the memory array, store a bit-value in the mode register indicative of a modified refresh rate, and refresh the memory array consistent with the modified refresh rate as indicated by the mode register.

The request can be a command provided by a host. The command can be accompanied by a key corresponding to the protected region such the refresh mode selection command is verified utilizing the key corresponding to a corresponding protected region.

The mode register can be configured to store a plurality of data values corresponding to a plurality of refresh rates including the refresh rate and the modified refresh rate. The mode registers can store a plurality of refresh rates utilizing a plurality of bits such that each bit-value can be mapped to a different refresh rate.

Figure 4:
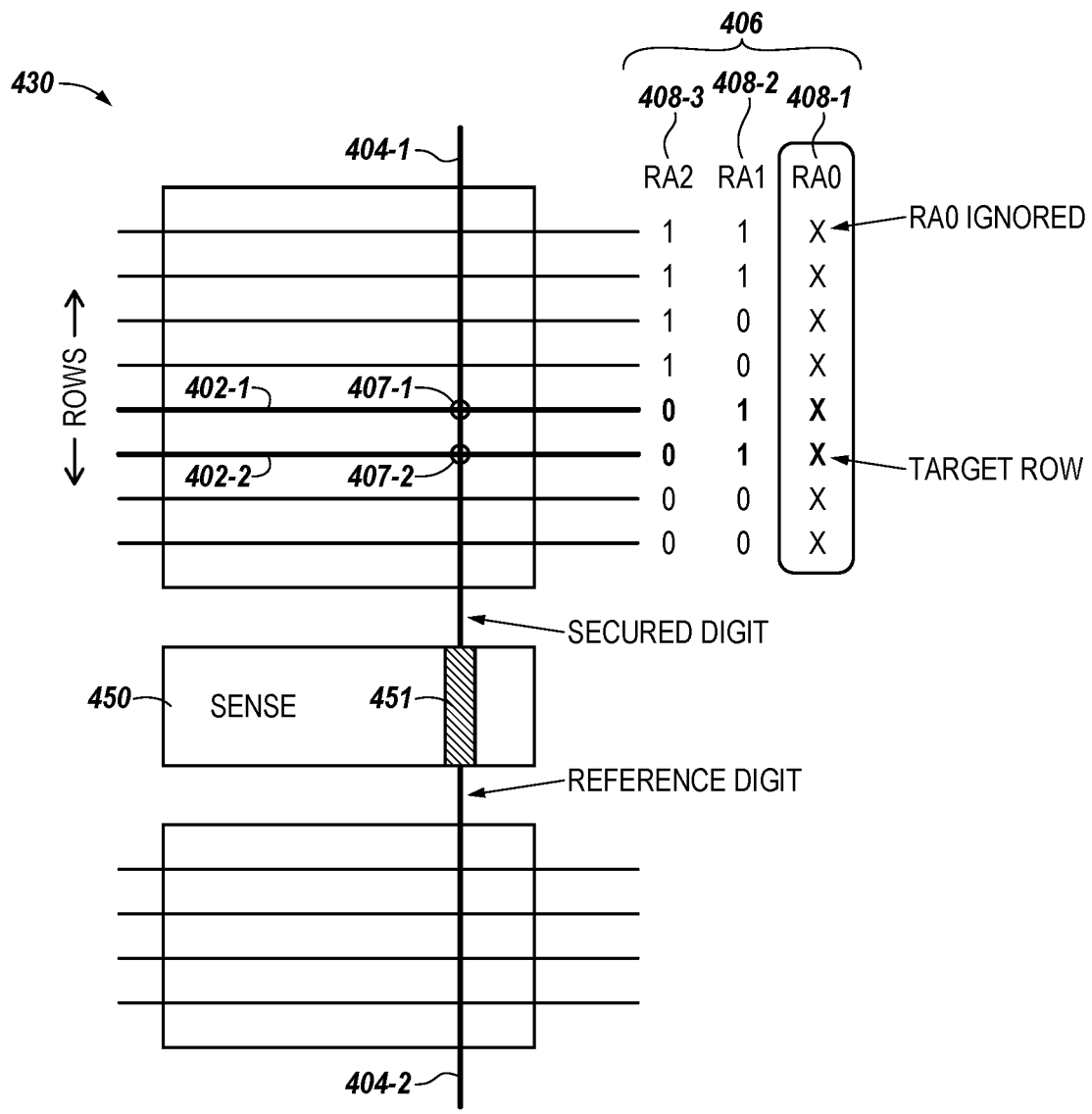
FIG. 4 is a block diagram of a memory array implementing an access mode in accordance with a number of embodiments of the present disclosure.

FIG. 4 is a block diagram of a memory array 430 implementing an access mode in accordance with a number of embodiments of the present disclosure. The memory array 430 can comprise memory cells arranged in rows coupled by access lines (which may be referred to herein as word lines or select lines) and columns coupled by sense lines (which may be referred to herein as digit lines or data lines). As such, the access lines may be referred to as rows of the memory array 430 and the sense lines may be referred to as columns of the memory array 430. The access lines include access line 402-1 and 402-2. The sense lines include sense line 404-1 and 404-2.

FIG. 4 also includes the sensing circuitry 450. The sensing circuitry 450 can include a plurality of sense amplifiers including sensing amplifier 451. The sensing amplifier can be coupled to the sense lines 404-1 and 404-2. The sense line 404-1 can provide a sense digit and the sense line 404-2 can provide a reference digit. FIG. 4 also include memory cells 407-1 and 407-2. The memory cell 407-1 is coupled to the access line 402-1 and the sense line 404-1. The memory cell 407-2 is coupled to the access line 402-1 and the sense line 404-2.

FIG. 4 illustrates the implementation of a 2T access mode. In a 2T access mode, multiple memory cells are used to store a single bit. For example, the memory cells 407-1 and 407-2 can be used to store a single bit. Utilizing multiple memory cells to store a single bit can utilize more memory cells than utilizing a single memory cell to store a single bit. Utilizing two memory cells to store a bit can decrease the amount of data able to be stored in the protected regions by half as compared to utilizing a single memory cell to store a bit. In a 1T access mode a single memory cell is used to store a single bit.

FIG. 4 also shows an address scheme for the rows of the memory array 430. The row address (RA) for the memory array 430 can comprise three bits. The least significant bit of the row address can be labeled RA0 408-1, the next least significant bit of the row address can be labeled RA1 408-2, and the most significant row address can be labeled RA2 408-3. Although the row addresses are comprised of three bits in the example provided in FIG. 4, row addresses can be defined utilizing more or fewer bits than those shown herein. The row addresses provided herein are for illustrative purposes and are not intended to be limiting. In the 2T access mode, the least significant bit can be compressed out (e.g., ignored) when accessing memory cells in the protected region of the memory array 430.

For example, if an address of the access line 402-1 is the 011 bit-value and the address of the access line 402-1 is the 010 bit-value, then ignoring the least significant bit can result in both the access line 402-1 and the access line 402-1 having the same address of the 01X bit-value. Providing the same address for both the access lines 402-1 402-2 can provide for the concurrent activation of the access lines 402-1 and 402-2. Concurrently activating the access lines 402-1 and 402-2 can lead to the accumulation of the charges stored in the memory cells 407-1 and 407-2 in the sensing amplifier 451. That is, the combined charge of the memory cells 407-1 and 407-2 can be placed on the sense line 404-1 and transferred to the sensing amplifier 451.

The controller can utilize a same look-up table that the protected region detect logic utilizes when functioning in the 2T access mode. The detect logic can describe logic configured to determine whether an address or a plurality of addresses are in the protected region. The controller can determine that the protected region is functioning with half density responsive by retrieving the 2T access mode from the mode registers. Responsive to determining that the protected region is functioning with half density, the controller can compress out the least significant bit of the row address. Upon activating a row, the address provided to the memory device can be internally compared to the protected region (e.g., protected region range of addresses) for a secure/keyed access utilizing the protected region detect logic. The protected region register, utilizing a set off addresses or tables, can define the protected region. The protected region register can be used for the purpose of defining if the region is functioning in one of the open array style 2T2C modes. Changing between a 1T1C and 2T2C open architecture can provide for reusing the protected region register to determine whether an address is in a protected region.

In some examples, the controller can determine the access mode prior to storing data in the protected region. For example, responsive to determining a 1T access mode that utilizes a memory cell to store a bit, the memory device can store a bit utilizing a single memory cell. Responsive to determining that the access mode is a 2T access mode, the memory device can store a bit utilizing a two memory cells. In the example of FIG. 4, each of the two memory cells 407-1 and 407-2 can store a charge representing the same bit. For example, if the bit to be stored is a 1 bit, then the memory cells 407-1 and 407-2 can each store a charge corresponding to the 1 bit.

Accumulating the charge of the memory cells 407-1 and 407-2 to sense a single bit can increase the voltage margin as compared to a reference voltage. Increasing the voltage margin can provide for security by providing a greater margin of error before experiencing a fault associated with the storage of a charge in a memory cell. For example, if a 1T access mode is implemented, a digit voltage is 0.5 V, and the cell voltage is 1.2 V, then the final voltage can be 0.7 V which results in a sense voltage margin of 0.2 V. The digit voltage can be referred to as a reference voltage and the final voltage can be referred to as a sensed voltage. The final voltage can be a voltage that is sensed by the sensing circuitry 451. If a 2T access mode is implemented, a digit voltage is 0.5 V, the cell voltage is 1.2 V x 2, and the final voltage can be 0.811 V. The sense voltage margin for the 2T access mode shown in FIG. 4 is 0.311V. The sense voltage margin of 0.2 V for the 1T access mode is less than the 0.311 V providing for a greater tolerance in retrieving the data stored in the protected region. The digit voltage, cell voltage, final voltage, and/or sense voltage margin provided herein are exemplary and not limiting.

In some examples, the memory cells 407-1 and 407-2 can be adjacent memory cells. The access lines 402-1 and 402-2 can also be adjacent access lines. In various examples, the memory cell 407-1 and 407-2 may not be adjacent memory cells. The access lines 402-1 and 402-2 may also be non-adjacent access lines.

Figure 5:
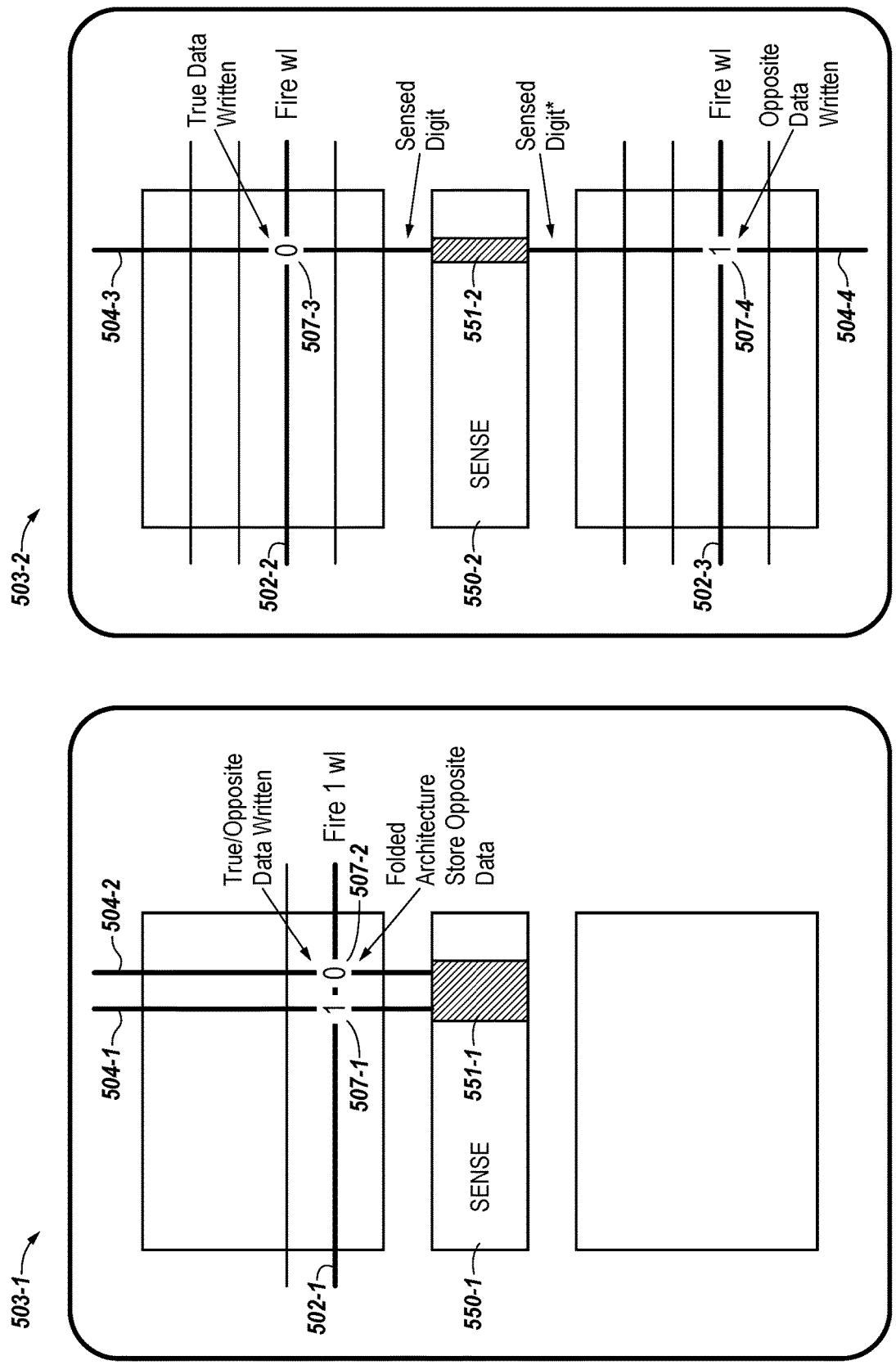
FIG. 5 is a block diagram of memory arrays implementing access modes in accordance with a number of embodiments of the present disclosure.

FIG. 5 is a block diagram of memory arrays 503-1 and 503-2 implementing access modes in accordance with a number of embodiments of the present disclosure. The memory array 503-1 includes the sensing circuitry 550-1, sensing amplifier 551-1, access line 502-1, and sense lines 504-1 and 504-2. The memory array 503-2 includes sensing circuitry 550-2, sensing amplifier 551-2, access lines 502-2 and 502-3, and sense lines 504-3 and 504-4.

The memory cell 507-1 of the memory array 503-1 is coupled to the access line 502-1 and the sense line 504-1. The memory cell 507-2 of the memory array 503-1 is coupled to the access line 502-1 and the sense line 504-2. The memory cell 507-3 of the memory array 503-2 is coupled to the access line 502-2 and the sense line 504-3. The memory cell 507-4 of the memory array 503-2 is coupled to the access line 502-3 and the sense line 504-1. The sense lines 504-1 and 504-2 are coupled to the sensing amplifier 551-1 in the memory array 503-1. The sense lines 504-3 and 504-4 are coupled to the sensing amplifier 551-2 in the memory array 503-2.

The memory array 503-1 implements a folded architecture. In a folded architecture, sense lines can be coupled to a same sensing amplifier. For example, the sense lines 504-1 and 504-2 are commonly coupled to the sensing amplifier 551-1. Commonly, coupling the sense lines 504-1 and 504-2 provides for the aggregation of the charge stored in the memory cells 507-1 and 507-2.

The memory array 503-1 having a folded architecture implements a 2T access mode. However, in contrast to the example provided in FIG. 4, the memory cells 507-1 and 507-2 store different charges representing a 0 bit-value and a 1 bit-value. For example, the memory cell 507-1 stores a 1 bit-value and the memory cell 507-1 stores a 0 bit-value.

In the folded architecture shown in association with memory array 503-1 and open architecture shown in association with memory array 503-2, implementing the 2T access mode can result in a 1.2 V for the cell voltage, 0.5 V for the digit voltage, and 0.7 V for the final voltage, for the memory cells 507-1 and 507-4. The cell voltage can be 0.0 V, the digit voltage is 0.5 V, and the final voltage is 0.357 for the memory cells 507-2 and 507-3. The sense voltage margin is 0.343 V.

The memory cells 503-2 and 503-3 are coupled to different sense lines 504-3 and 504-4 as opposed to a same sense line as shown in FIG. 4. The decoding of the address of the cell to be accessed results in the word lines 502-2 and 502-3 being fired together. Firing the word lines 502-2 and 502-3 together provides for the activation of the memory cells 507-3 and 507-4 together. Activating the memory cells 507-3 and 507-4 together provides for the aggregation of the charges stored in the memory cells 507-3 and 507-4.

The charges used to store a bit in FIGS. 4 and 5 are different. In FIG. 4 a same charge is stored in two different memory cells. In FIG. 5, different charges are stored in the memory cells 507-3 and 507-4. For example, a charge representing a 1 bit can be stored in the memory cell 507-4 and a different charge or lack of a charge representing a 0 bit can be stored in the memory cell 507-3. FIG. 5 further illustrates that multiple memory cells can be used to store a single bit value by activating multiple access lines and/or multiple sense lines such as access lines 502-2 and 502-3 and sense lines 504-3 and 504-4, respectively.

Figure 6:
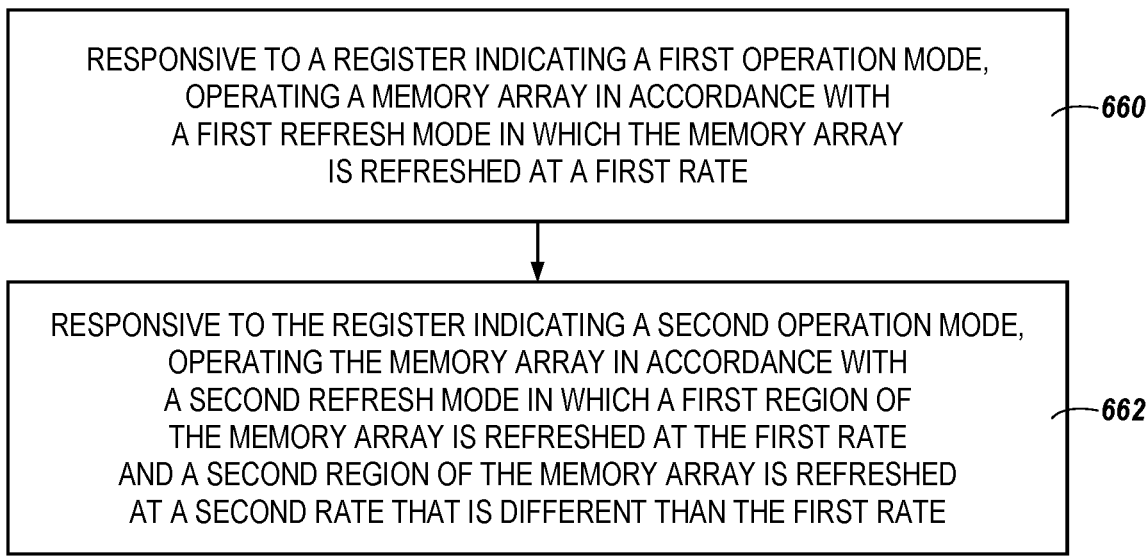
FIG. 6 illustrates an example flow diagram of a method for implementing refresh modes in a memory array in accordance with a number of embodiments of the present disclosure.

FIG. 6 illustrates an example flow diagram of a method for implementing refresh modes in a memory array in accordance with a number of embodiments of the present disclosure. At 660, responsive to a register indicating a first operation mode, a memory array can be operated in accordance with a first refresh mode in which the memory array is refreshed at a first rate. At 662, responsive to the register indicating a second operation mode, the memory array can be operated in accordance with a second refresh mode in which a first region of the memory array is refreshed at the first rate and a second region of the memory array is refreshed at a second rate that is different than the first rate.

The method can also include receiving a command to set an operation mode of the memory array and a value associated with the command. The value received with the command can be a key corresponding to the command. The key can be used to validate the command. Responsive to receipt of the command and a first key corresponding to the command, the first key can be compared to a second key corresponding to the register. Responsive to determining that the first key matches the second key, the value can be stored in the register, wherein the value is one of the first operation mode or the second operation mode. Responsive to determining that the first key does not match the second key, the value may not be stored in the register.

In various examples, the register can store any number of operations modes. For example, the register can store a third operation mode. Responsive to the register indicating a third operation mode, the memory array can be operated in accordance with a third refresh mode in which the first region of the memory array is refreshed at the first rate and a third region of the memory array is refreshed at a third rate. Each of the refresh rates associated with the protected regions can be different. For example, the first rate, the second rate, and the third rate can be different rates. In different examples, some of the refresh rates can be a same refresh rate while other of the refresh rates are different refresh rates. For instance, at least two of the first rate, the second rate, and the third rate can be a same rate.

The refresh rates can be altered based on a level of protection offered to data stored in a particular region of the memory array. For instance, the second region of the memory array can store sensitive data such that the second fresh rate is used to refresh the second region at a higher frequency than a refresh frequency corresponding to the first refresh rate which is used to refresh the first region.

In various examples, a control circuitry coupled to the memory array can be configured to be responsive to a first register indicating a first operation mode, operate the memory array in accordance with a first refresh mode in which the memory array is refreshed at a first rate. Responsive to the first register indicating a second operation mode, the control circuitry can be configured to operate the memory array in accordance with a second refresh mode in which a first region of the memory array is refreshed at the first rate and a second region of the memory array is refreshed at a second rate that is different than the first rate.

Responsive to the first register indicating the second operation mode, a received access command can be prevented from accessing the second region of the memory array unless the received access command is authenticated via an authentication process. Responsive to the first register indicating the first operation mode, the received access command can be allowed to access the second region of the memory array and to access the first region of the memory array without being authenticated via the authentication process.

The authentication process can be performed by comparing a key associated with the received access command to a key stored in a second register. In some examples, an apparatus implementing the examples described herein can comprise a memory device comprising a memory array, the control circuitry, and a plurality of registers including the first register. The apparatus can also include a host coupled to the memory device via an interface, wherein the authentication process is performed on the memory device. In some examples, the authentication process can be performed without direction from the host. The host can provide the key (e.g., value) without directing the performance of the authentication process and/or how the authentication process is to be carried out.

Responsive to the first register indicating the second operation mode, the control circuitry can further be configured to access the first region of the memory array according to a first access mode and access the second region of the memory array according to a second access mode that is different than the first access mode. Responsive to the first register indicating the first operation mode, the control circuitry can further be configured to access the first region and the second region of the memory array according to the first access mode. In some examples, the first access mode can comprise activating a single word line to sense a stored data value and the second access mode can comprise activating at least two word lines to sense the stored data value.

In examples comprising an open sense line architecture, data values can be stored in the second region of the array by storing charge corresponding to a same data value to adjacent cells, wherein the adjacent cells are coupled to a first sense line and to different word lines and data values stored within the second region can be read via a sense amplifier coupled to the first sense line and to a reference sense line. In examples comprising an open sense line architecture, data values can be stored in the second region of the array by storing charge corresponding to one of a true and a complement data value in a first cell coupled to a first sense line and to a first word line and storing charge corresponding to the other of the true and the complement data value in a second cell coupled to a complementary sense line and to a different word line. Data values stored within the second region can be read via a sense amplifier coupled to the first sense line and to the complementary sense line.

In examples where the memory array comprises a folded sense line architecture, data values can be stored in the second region of the array by storing charge corresponding to one of a true and a complement data value in a first cell coupled to a first sense line and to a first word line. Data values can also be stored by storing charge corresponding to the other of the true and the complement data value in a second cell coupled to a complementary sense line and to the first word line. Data values stored within the second region can also be read via a sense amplifier coupled to the first sense line and to the complementary sense line.

In some examples, control circuitry can be configured to responsive to a register indicating a first operation mode, access the memory array via a first access mode and responsive to the register indicating a second operation mode, access a first region of the array via the first access mode and access a second region of the memory array via a second access mode. The first access mode can comprise an access mode in which data values are stored via charge stored on a single charge storage structure and the second access mode can comprise an access mode in which data values are stored via charge stored on multiple charge storage structures.

The second operation mode can comprise a secure operation mode in which the control circuitry is configured to prevent a received access command from accessing the second region of the array unless the received access command is authenticated via an authentication process. The first operation mode can comprise an operation mode in which the control circuitry is configured to allow the received access command to access the second region of the array and to access the first region of the array without being authenticated via the authentication process.

A first key and an address corresponding to the received access command can be received. The control circuitry can further be configured to determine that the address is in the second region and, responsive to receipt of the access command and the address being in the second region, compare the first key with a second key corresponding to the second region to determine whether to grant access to the second region, wherein the second key corresponds to the second region. Responsive to the first key matching the second key, the received access command can be allowed access the second region of the memory array via the second access mode.

Although the access modes and refresh modes are discussed separately herein, the access modes and refresh modes can be set concurrently on memory. For example, a portion of memory (e.g., protected region of memory) can be configured with a 2T access mode for an open architecture and can be configured with a 3× refresh rate at a same time. Accordingly, the examples described herein can be combined.

Figure 7:
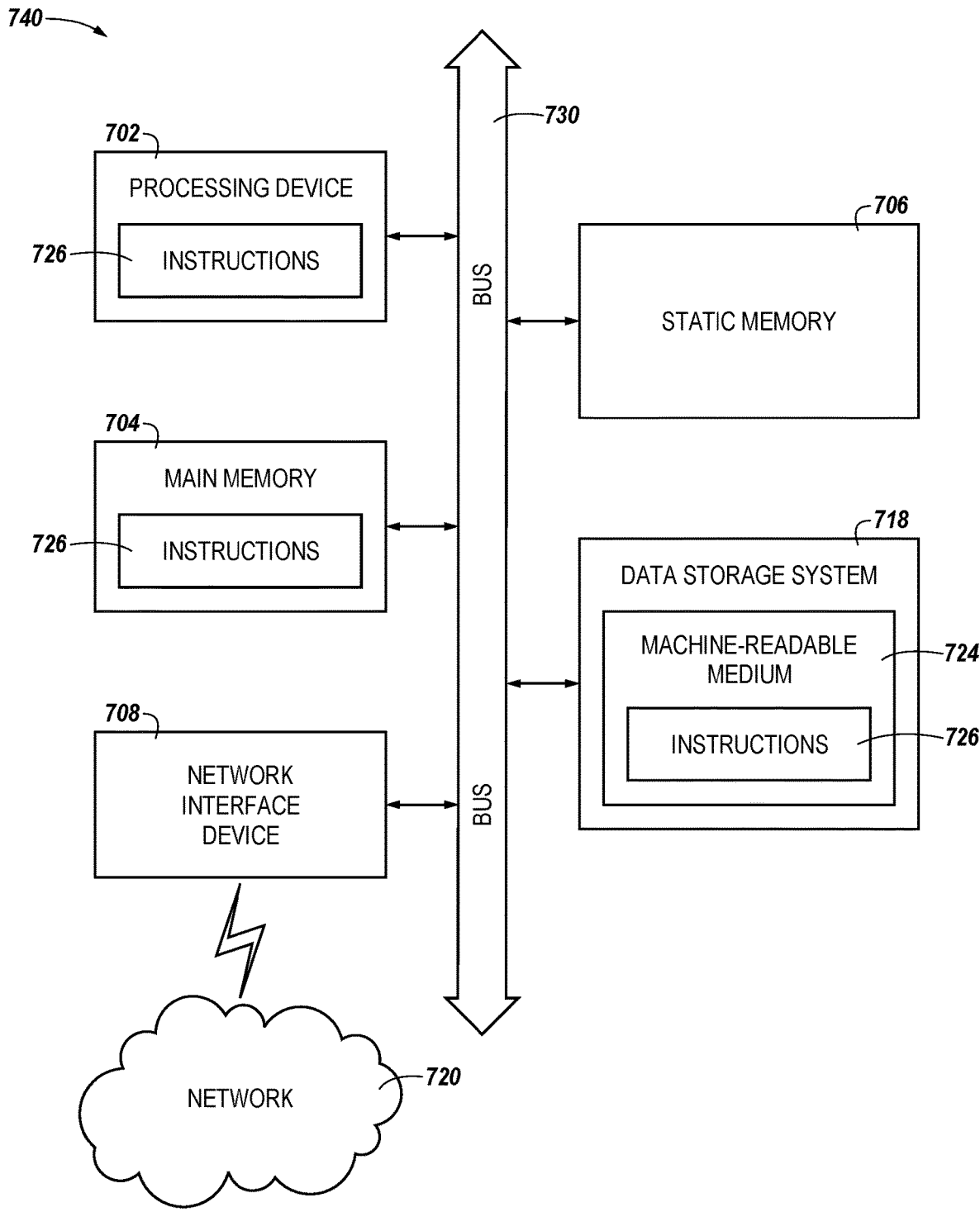
FIG. 7 illustrates an example machine of a computer system within which a set of instructions, for causing the machine to perform various methodologies discussed herein, can be executed.

FIG. 7 illustrates an example machine of a computer system 740 within which a set of instructions, for causing the machine to perform various methodologies discussed herein, can be executed. In various embodiments, the computer system 740 can correspond to a host system (e.g., the system 110 of FIG. 1) that includes, is coupled to, or utilizes a memory sub-system (e.g., the memory device 120 of FIG. 1) or can be used to perform the operations of a controller (e.g., the controller 140 of FIG. 1, including the register 224, 226, 228, and 231 of FIG. 2). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 740 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage system 718, which communicate with each other via a bus 730.

Processing device 702 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 702 can also be one or more special-purpose processing devices such as an application specific integrated circuit (ASIC), a field programmable gate array (FPGA), a digital signal processor (DSP), network processor, or the like. The processing device 702 is configured to execute instructions 726 for performing the operations and steps discussed herein. The computer system 740 can further include a network interface device 708 to communicate over the network 720.

The data storage system 718 can include a machine-readable storage medium 724 (also known as a computer-readable medium) on which is stored one or more sets of instructions 726 or software embodying any one or more of the methodologies or functions described herein. The instructions 726 can also reside, completely or at least partially, within the main memory 704 and/or within the processing device 702 during execution thereof by the computer system 740, the main memory 704 and the processing device 702 also constituting machine-readable storage media.

In one embodiment, the instructions 726 include instructions to implement functionality corresponding to the controller 140 of FIG. 1. While the machine-readable storage medium 724 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Although specific embodiments have been illustrated and described herein, those of ordinary skill in the art will appreciate that an arrangement calculated to achieve the same results can be substituted for the specific embodiments shown. This disclosure is intended to cover adaptations or variations of various embodiments of the present disclosure. It is to be understood that the above description has been made in an illustrative fashion, and not a restrictive one. Combinations of the above embodiments, and other embodiments not specifically described herein will be apparent to those of skill in the art upon reviewing the above description. The scope of the various embodiments of the present disclosure includes other applications in which the above structures and methods are used. Therefore, the scope of various embodiments of the present disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus, comprising:
    a memory array; and
    control circuitry coupled to the memory array and configured to:
        responsive to a first register value indicating a first operation mode, operate the memory array in accordance with a first refresh mode in which the memory array is refreshed at a first rate; and
        responsive to the first register value indicating a second operation mode, operate the memory array in accordance with a second refresh mode in which a first region of the memory array is refreshed at the first rate and a second region of the memory array is refreshed at a second rate that is different than the first rate.

2. The apparatus of claim 1, wherein the control circuitry is further configured to:
    responsive to the first register value indicating the second operation mode, prevent, in response to a received access command, access to the second region of the memory array unless the received access command is authenticated via an authentication process; and
    responsive to the first register value indicating the first operation mode, allow, in response to the received access command, access to the second region of the memory array and to access the first region of the memory array without being authenticated via the authentication process.

3. The apparatus of claim 2, wherein control circuitry is further configured to perform the authentication process by comparing a value associated with the received access command to a value stored in a second register value.

4. The apparatus of claim 2, wherein the apparatus comprises:
    a memory device comprising the memory array, the control circuitry, and a plurality of register values including the first register value; and
    a host coupled to the memory device via an interface, wherein the authentication process is performed on the memory device and without direction from the host.

5. The apparatus of claim 1, wherein, responsive to the first register value indicating the second operation mode, the control circuitry is further configured to:
    access the first region of the memory array according to a first access mode; and
    access the second region of the memory array according to a second access mode that is different than the first access mode.

6. The apparatus of claim 5, wherein, responsive to the first register value indicating the first operation mode, the control circuitry is further configured to access the first region and the second region of the memory array according to the first access mode.

7. The apparatus of claim 5, wherein;
    the first access mode comprises activating a single word line to sense a stored data value; and
    the second access mode comprises activating at least two word lines to sense the stored data value.

8. The apparatus of claim 7, wherein the memory array comprises an open sense line architecture, and wherein the control circuitry is configured to:
    store data values in the second region of the array by storing charge corresponding to a same data value to adjacent cells, wherein the adjacent cells are coupled to a first sense line and to different word lines; and
    read data values stored within the second region via a sense amplifier coupled to the first sense line and to a reference sense line.

9. The apparatus of claim 7, wherein the memory array comprises an open sense line architecture, and wherein the control circuitry is configured to:
    store data values in the second region of the array by:
        storing charge corresponding to one of a true and a complement data value in a first cell coupled to a first sense line and to a first word line; and
        storing charge corresponding to the other of the true and the complement data value in a second cell coupled to a complementary sense line and to a different word line; and
    read data values stored within the second region via a sense amplifier coupled to the first sense line and to the complementary sense line.

10. The apparatus of claim 5, wherein the memory array comprises a folded sense line architecture, and wherein the control circuitry is configured to:
    store data values in the second region of the array by:
        storing charge corresponding to one of a true and a complement data value in a first cell coupled to a first sense line and to a first word line; and
        storing charge corresponding to the other of the true and the complement data value in a second cell coupled to a complementary sense line and to the first word line; and
    read data values stored within the second region via a sense amplifier coupled to the first sense line and to the complementary sense line.

11. The apparatus of claim 1, wherein the first rate is a slower rate than the second rate.

12. An apparatus, comprising:
    a memory array; and
    control circuitry coupled to the memory array and configured to:
        responsive to a register value indicating a first operation mode, access the memory array via a first access mode; and
        responsive to the register value indicating a second operation mode, access a first region of the array via the first access mode and access a second region of the memory array via a second access mode;
    wherein the first access mode comprises an access mode in which data values are stored via charge stored on a single charge storage structure; and
    wherein the second access mode comprises an access mode in which data values are stored via charge stored on multiple charge storage structures.

13. The apparatus of claim 12, wherein:
the second operation mode comprises a secure operation mode in which the control circuitry is configured to prevent a received access command from accessing the second region of the array unless the received access command is authenticated via an authentication process; and
the first operation mode comprises an operation mode in which the control circuitry is configured to allow the received access command to access the second region of the array and to access the first region of the array without being authenticated via the authentication process.

14. The apparatus of claim 13, wherein the control circuitry is further configured to receive a first key and an address corresponding to the received access command.

15. The apparatus of claim 14, wherein the control circuitry is further configured to:
determine that the address is in the second region;
responsive to receipt of the access command and the address being in the second region, compare the first key with a second key corresponding to the second region to determine whether to grant access to the second region, wherein the second key corresponds to the second region.

16. The apparatus of claim 15, wherein the control circuitry is further configured to responsive to the first key matching the second key, allow the received access command to access the second region of the memory array via the second access mode.

17. The apparatus of claim 1, wherein the register value is stored in a multipurpose registers (MPRs).

18. A method, comprising:
responsive to a register value indicating a first operation mode, operating a memory array in accordance with a first refresh mode in which the memory array is refreshed at a first rate; and
responsive to the register value indicating a second operation mode, operating the memory array in accordance with a second refresh mode in which a first region of the memory array is refreshed at the first rate and a second region of the memory array is refreshed at a second rate that is different than the first rate.

19. The method of claim 18, further comprising receiving a command to set an operation mode of the memory array and a value associated with the command.

20. The method of claim 19, further comprising:
responsive to receipt of the command and a first key corresponding to the command, comparing the first key with a second key corresponding to a register; and
responsive to determining that the first key matches the second key, storing the value in the register, wherein the value is one of the first operation mode or the second operation mode.

21. The method of claim 20, further comprising responsive to determining that the first key does not match the second key, refraining from storing the value in the register.

22. The method of claim 18, further comprising:
responsive to the register value indicating a third operation mode, operating the memory array in accordance with a third refresh mode in which the first region of the memory array is refreshed at the first rate and a third region of the memory array is refreshed at a third rate.

23. The method of claim 22, wherein the first rate, the second rate, and the third rate are different rates.

24. The method of claim 22, wherein at least two of the first rate, the second rate, and the third rate are a same rate.

25. The method of claim 18, wherein the second region of the memory array stores sensitive data such that the second fresh rate is used to refresh the second region at a higher frequency than a refresh frequency corresponding to the first refresh rate which is used to refresh the first region.

* * * * *